United States Patent Office 3,798,232
Patented Mar. 19, 1974

3,798,232
2-(FURFURYLAMINO)-1-(2-IMIDAZOLIN-2-YL)-2-IMIDAZOLINE HYDROIODIDE
Raymond R. Wittekind, Morristown, and John Shavel, Jr., Mendham, N.J., assignors to Warner-Lambert Company, Morris Plains, N.J.
No Drawing. Continuation-in-part of application Ser. No. 6,639, Jan. 28, 1970, now Patent No. 3,666,767, dated May 30, 1972. This application May 15, 1972, Ser. No. 253,074
Int. Cl. C07d 49/34
U.S. Cl. 260—309.6
1 Claim

ABSTRACT OF THE DISCLOSURE

The present invention relates to 2-amino-1-(2-imidazolin-2-yl)-2-imidazolines, the free base of which has the following structural formulas:

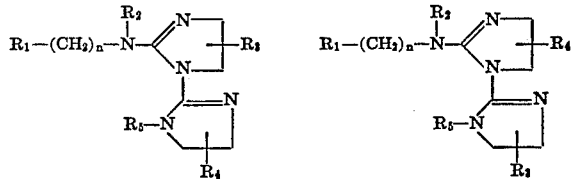

wherein
$R_1$ is hydrogen, lower alkyl, cycloalkyl, aryl, substituted aryl, heterocyclic, substituted heterocyclic or aryloxy;
$R_2$ is hydrogen, lower alkyl, aryl and substituted aryl; or $R_1$ and $R_2$ taken together with the nitrogen atom to which they are attached form a heterocyclic ring;
$R_3$ and $R_4$ are hydrogen, lower alkyl, aryl or substituted aryl;
$R_5$ is hydrogen, lower alkyl, aryl or substituted aryl;
$n$ is an integer from 0 to 10.

The compounds of this invention are useful as antiarrhythmic agents as well as antibacterial agents.

---

This application is a continuation-in-part of our copending application, U.S. Ser. No. 6,639, filed Jan. 28, 1970, now U.S. Pat. No. 3,666,767, issued May 30, 1972.

The present invention relates to 2-amino-1-(2-imidazolin-2-yl) - 2 - imidazolines having the following structural formulas:

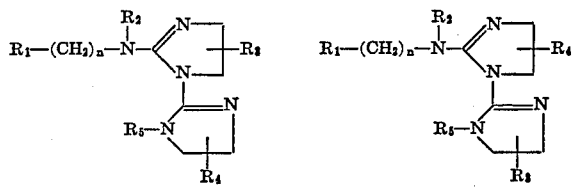

wherein $R_1$ is hydrogen, lower alkyl, cycloalkyl, heterocyclic, substituted heterocyclic, aryl, substituted aryl, or aryloxy;
$R_2$ is hydrogen, lower alkyl, aryl, substituted aryl; or
$R_1$ and $R_2$ taken together with the nitrogen atom to which they are attached form a heterocyclic ring, for example, a 5- or 6-membered ring;
$R_3$ and $R_4$ are hydrogen, lower alkyl, aryl or substituted aryl;
$R_5$ is hydrogen, lower alkyl, aryl or substituted aryl;
$n$ is an integer from 0 to 10.

In the definitions for $R_1$, $R_2$, $R_3$, $R_4$, and $R_5$, the term "lower alkyl" includes lower aliphatic hydrocarbons having 1 to 10 carbon atoms in the carbon chain. It includes straight chain as well as branched chain radicals. The term also includes, for example, methyl, ethyl, propyl, isopropyl, butyl, isobutyl and the like. The term "cycloalkyl" encompasses saturated monocyclic groups having from 3 to 8 carbon atoms, such as cyclopropyl, cyclobutyl, cyclopentyl, cyclohexyl, cycloheptyl, and cyclooctyl. The term "heterocyclic" encompasses the monocyclic 5- and 6-membered hetero rings having at least one hetero atom in the ring which may be either nitrogen, oxygen or sulfur. Representative heterocyclics falling within this definition are, for example, aziridinyl, azetidinyl, pyrrolyl, pyrrolidinyl, morpholino, thienyl, furyl, pyridyl, piperidyl, indolyl, and the like. Additionally, these 5- and 6-membered heterocyclics may have further substituents in their ring portions by groups such as, hydrogen, halogen, lower alkyl and lower alkoxy. The term "aryl" denotes a monocyclic or bicyclic hydrocarbon radical, preferably of 6 to 10 carbon atoms, such as for example, phenyl, naphthyl and the like. The term "substituted aryl" as used herein includes aryl as defined above in which one or more of the hydrogen atoms of the aryl portion have been substituted by groups such as, halogen, hydroxyl, lower alkyl, trifluoromethyl, amino, substituted amino or lower alkoxy. X, in the formulas below, includes anions such as the halides, for example, fluoride, chloride, iodide, bromide, or other anions such as, sulfate, nitrate, phosphate, maleate, fumarate and the like.

The definitions for $R_1$, $R_2$, $R_3$, $R_4$ and $R_5$, and $n$ as used hereinafter have the same meanings as defined above.

The compounds of this invention exhibit anti-arrhythmic activity, for example, at a dosage of about 2 to 3 mg./kg., body weight in a mammal such as, cats, dogs, monkeys, and the like. In experimentally induced arrhythmia, such as those induced by ouabain, at a dosage of 2 to 3 mg./kg., the compounds of this invention are capable of arresting such arrhythmia. Generally speaking, the compounds of this invention are useful in conditions associated with cardiac arrhythmia. A dosage level of about 1 to 10 mg., several times daily is recommended. This dosage regimen can be varied according to body weight, sex and species of the mammal being treated.

Among the dosage forms which can be used to administer these compounds are, for example, tablets, powders, elixirs, suspensions and the like. These dosage forms are formulated by procedures known to the pharmacist's art.

All the compounds of this invention also exhibit antibacterial activity against gram-positive cocci, such as *Staphylococcus aureus* or gram-negative bacilli, such as *E. coli*. To use the compound as anti-bacterials, they are formulated from 1 to 10% by weight with a dermatologically acceptable vehicle, such as talc, petrolatum and applied liberally to the site infected with the susceptible bacteria.

The preferred genus of this invention is a compound of the structure:

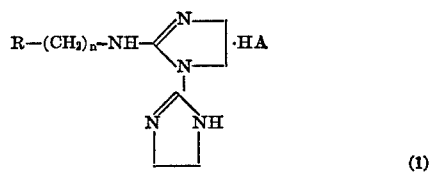

where
$R$ = a heteroaromatic group such as furfuryl, 2-(3H-pyrazol-3-yl), 2-(4-imidazolyl), 5-methyl-1,3,4-thiadiazolyl, 2-benzimidazolyl, 2-benzthiazolyl, 2-thiazolyl, 2-(6-methoxypyridazinyl) and the like.
$n$ = 0 to 3.
$A$ = an anionic group such as halide, maleate, fumarate and the like.

These compounds are prepared as follows:

(A)

$$R-(CH_2)_n-NH_2 + \underset{(2)}{} \underset{\cdot HA}{\text{[imidazoline-SCH}_3\text{]}} \longrightarrow$$

$$R-(CH_2)_n-NH-\text{[imidazoline]}\cdot HA$$
(1)

(B)

$$R-(CH_2)_n-NH_2 + \underset{(2)}{} \underset{\begin{array}{c}\cdot CH_3SH \\ \cdot HA\end{array}}{\text{[imidazoline-}\overset{+}{N}(C_2H_5)_3 A^-\text{]}} \longrightarrow (1)$$
(4)

where R, n and A have the same meaning as above.

2-propanol and acetonitrile are useful solvents for these processes.

The amines (2) and their acid addition salts are available from Aldrich Chemical Company and can be prepared by methods outlined in Synthetic Organic Chemistry by R. B. Wagner and H. D. Zook, John Wiley and Sons, Inc., New York, N.Y., 1953, p. 653 and p. 832.

1-(2-imidazolin-2-yl)-2-(methylthio)-2-imidazoline hydroiodide (3) and triethyl[1-(2-imidazolin-2-yl)-2-imidazolin-2-yl]ammonium iodide hydroiodide methanethiol (4) were prepared by the processes depicted below, where A has the same meaning as given above.

(C)

$$\text{[imidazole]-SCH}_3 + \text{[imidazole]-SCH}_3 \cdot HA \longrightarrow \text{[imidazoline]-SCH}_3 \cdot HA$$
(5)    (6)    (3)

(D)

$$\text{[imidazole]-SCH}_3 \cdot HA + (C_2H_5)_3N \longrightarrow \text{[imidazoline]-}\overset{+}{N}(C_2H_5)_3A^- \cdot HA$$
(5)    (7)    (4)

2-methylmercaptoimidazol-2-ine (6) and the corresponding salts (5) are prepared according to procedures described in S. R. Aspinall and E. J. Bianco, J. Org. Chem., 73, 602 (1951), W. Wilson, J. Chem. Soc., 1389 (1955) and A. L. Langis and F. Herr, Can., 736, 494 (June 14, 1966), C. A., 65, 12212 (1966).

2-propanol and acetonitrile are useful solvents for these processes.

To further illustrate the practice of this invention the following examples are included.

EXAMPLE 1

2-(furfurylamino)-1-(2-imidazolin-2-yl)-2-imidazoline hydroiodide

A solution of furfurylamine (11.6 g., 0.120 mole), 1-(2-imidazolin-2-yl)-(2 - methylthio)-2-imidazoline hydroiodide (37.1 g., 0.120 mole) and 2-propanol (300 ml.) was heated under reflux for 1 hour during which time a steady stream of nitrogen was passed through the reaction mixture. The solution was allowed to cool to room temperature and the solid was collected. Recrystallization from 2-propanol (2 times) gave 14.6 g. (34%) of the imidazoline, M.P. 201–202°.

Analysis.—Calcd. for $C_{11}H_{16}IN_5O$ (percent): C, 36.58; H, 4.66; I, 35.14; N, 19.39; O, 4.43. Found (percent): C, 36.59; H, 4.44; I, 34.98; N, 19.09; O, 4.72.

EXAMPLE 2

1-(2-imidazolin-2-yl)-2-{[2-(3H-pyrazol-3-yl)ethyl]amino}-2-imidazoline dihydrochloride A solution of 2-(3H-pyrazol-3-yl)ethylamine (11.0 g., 0.0600 mole), 1-(2-imidazolin-2-yl) - 2 - (methylthio)-2-imidazoline hydrate (12.1 g., 0.0600 mole) and 2-propanol (180 ml.) was heated under reflux for 3 hours while a steady stream of nitrogen was passed through the medium. The reaction mixture was allowed to cool to room temperature. The precipitate was collected. Recrystallization (2 times) from absolute ethanol gave 6.55 g. (34.1%) of the imidazoline, M.P. 292–293°.

Analysis.—Calcd. for $C_{11}H_{19}Cl_2N_7$ (percent): C, 41.26; H, 5.98; Cl, 22.14; N, 30.65. Found (percent): C, 41.36; H, 6.05; Cl, 22.38; N, 30.78.

EXAMPLE 3

1-(2-imidazolin-2-yl)-2-{[2-(4-imidazolyl)ethyl]amino}-2-imidazoline hydrochloride A solution of histamine dihydrochloride (22.1 g., 0.120 mole), 1-(2-imidazolin-2-yl)-2-(methylthio) - 2 - imidazoline hydrate (24.2 g., 0.120 mole) and 2-propanol (400 ml.) was heated under reflux while a steady stream of nitrogen was passed through the medium. The reaction mixture was allowed to cool to room temperature. The solid was collected and recrystallized from ethanol (3 times); yield 4.52 g. (13.2%) of the imidazoline, M.P. 192.0–193.0°.

Analysis.—Calcd. for $C_{11}H_{18}ClN_7$ (percent): C, 46.54; H, 6.39; Cl, 12.49; N, 34.58. Found (percent): C, 46.43; H, 6.24; Cl, 12.25; N, 34.72.

EXAMPLE 4

2-{[1-(2-imidazolin-2-yl)-2-imidazolin-2-yl]amino} benzothiazole hydrobromide monohydrate A solution of 2 - aminobenzothiazole (22.5 g., 0.15 mole), 1-(2-imidazolin-2-yl)-2-(methylthio) - 2 - imidazoline hydroiodide (15.6 g., 0.15 mole) and acetonitrile (750 ml. was heated under reflux for 20 hours during which time a stream of nitrogen was passed through the reaction mixture. The solution was allowed to cool to room temperature. The solid was collected and recrystallized from acetonitrile-water; yield 7.05 g. (11%) of the imidazoline, M.P. 305–307°.

Analysis.—Calcd. for $C_{13}H_{17}IN_6OS$ (percent): C, 36.12; H, 3.96; I, 29.36; N, 19.44; S, 7.42. Found (percent): C, 35.95; H, 4.14; I, 29.43; N, 19.51; S, 7.67.

EXAMPLE 5

2-{[1-(2-imidazolin-2-yl)-2-imidazolin-2-yl]amino}-5-methyl-1,3,4-thiadiazole

A solution of 2-amino-5-methyl-1,3,4-thiadiazole (8.06 g., 0.07 mole), 1-(2-imidazolin-2-yl)-2 - (methylthio) - 2-imidazoline hydroiodide 21.9 g. (0.07 mole) and acetonitrile (400 ml.) was heated under reflux for 3 days while a stream of nitrogen was passed through the reaction mixture. The solid was collected from the hot solution, and then dissolved in water (300 ml.) basified with 2 N sodium hydroxide solution and extracted with methylene chloride. The organic phase was dried over sodium sulfate, filtered and evaporated. Recrystallization of the residue from acetone gave 1.86 g. (11%) of the imidazoline, M.P. 190–192°.

Analysis.—Calcd. for $C_9H_{13}N_7S$ (percent): C, 43.01; H, 5.21; N, 39.01; S, 12.77. Found (percent): C, 43.05; H, 5.12; N, 39.10; S, 12.73.

EXAMPLE 6

2-{[1-(2-imidazolin-2-yl)-2-imidazolin-2-yl]amino}benzimidazole hydroiodide

A mixture of 2-aminobenzimidazole (8.0 g., 0.060 mole), triethyl[1 - (2-imidazolin-2-yl)-2-imidazolin-2-yl] ammonium iodide hydroiodide methanethiol (32.5 g., 0.0600 mole) and 2-propanol (distilled from calcium hydride, 150 ml.) was heated under reflux, with stirring, for 23 hours. A slow stream of nitrogen was bubbled through the reaction mixture during this time. The reaction mixture was allowed to cool to room temperature. The precipitate was collected and recrystallized from methanol; yield 2.9 g. (12%) of the imidazoline hydroiodide, M.P. 289.5–290.0° dec.

*Analysis.*—Calcd. for $C_{13}H_{16}N_7I$ (percent): C, 39.31; H, 4.06; N, 24.68; I, 31.95. Found (percent): C, 39.35; H, 4.16; N, 24.87; I, 31.77.

EXAMPLE 7

3-{[1-(2-imidazolin-2-yl)-2-imidazolin-2-yl]amino}-6-methoxypyridazine hydroiodide A solution of 3-amino-6-methoxypyridazine (48.8 g., 0.400 mole), 1 - (2 - imidazolin-2-yl)-2-(methylthio)-2-imidazoline hydroiodide (125 g., 0.400 mole) and acetonitrile (3 l.) was heated under reflux for 70 hours while a stream of nitrogen was passed through the reaction medium. The reaction mixture was allowed to cool to room temperature. The precipitate was collected and recrystallized from ethanol-water; yield 14.6 g. (9.0%) of the imidazoline hydroiodide, M.P. 249–250°.

*Analysis.*—Calcd. for $C_{11}H_{16}IN_7O$ (percent): C, 33.95; H, 4.14; I, 32.61; N, 25.19; O, 4.11. Found (percent): C, 33.87; H, 4.18; I, 32.87; N, 25.31; O, 4.35.

EXAMPLE 8

2-{[1-(2-imidazolin-2-yl)-2-imidazolin-2-yl]amino}thiazole hydroiodide

A solution of 2-aminothiazole (20.0 g., 0.150 mole), 1-(2-imidazolin-2-yl)-2-methylthio) - 2 - imidazoline hydroiodide (48.8 g., 0.150 mole) and acetonitrile (900 ml.) was heated under reflux for 18 hours while a steady stream of nitrogen was passed through the reaction mixture. The solution was cooled in an ice-bath. The precipitate was collected and recrystallized from ethanol; yield 6.31 g. (12%) of the imidazoline hydroiodide, M.P. 243–245°.

*Analysis.*—Calcd. for $C_9H_{13}IN_6S$ (percent): C, 29.68; H, 3.60; I, 34.84; N, 23.07; S, 8.80. Found (percent): C, 29.60; H, 3.73; I, 34.86; N, 23.24; S, 899.

We claim:

1. 2 - (furfurylamino) - 1-(2-imidazolin-2-yl)-2-imidazoline hydroiodide.

References Cited

UNITED STATES PATENTS

| | | | |
|---|---|---|---|
| 3,359,274 | 12/1967 | Warner | 260—296 R |

FOREIGN PATENTS

| | | | |
|---|---|---|---|
| 1,530,087 | 5/1968 | France | 260—309.6 |
| 1,016,514 | 1/1966 | Great Britain | 260—309.6 |

OTHER REFERENCES

Black et al.: Chem. Abst., vol. 75, No. 118317k (1971).
McFarland et al.: Chem Abst, vol. 72, No. 2508g (1970).
Protiva et al.: Chem. Abst., vol 52, column 1147 (1958).
Rippel et al.: Chem. Abst., vol. 74, No. 100054s (1971).

NATALIE TROUSOF, Primary Examiner

U.S. Cl. X.R.

260—247.5 R, 250 A, 293.7, 296 R, 302 A, 302 D, 304, 305, 306.8 D, 306.8 R, 309.2; 424—248, 250, 263, 267, 270, 273